United States Patent [19]

Cykman

[11] Patent Number: 4,693,099
[45] Date of Patent: Sep. 15, 1987

[54] LOCKING ARRANGEMENT FOR THE GEARSHIFT STICK OF VEHICLES

[76] Inventor: Josef Cykman, 75 Ben Yehuda St., Tel Aviv, Israel

[21] Appl. No.: 862,682

[22] Filed: May 13, 1986

Related U.S. Application Data

[63] Continuation-in-part of Ser. No. 650,310, Sep. 12, 1984, abandoned.

[30] Foreign Application Priority Data

Sep. 16, 1983 [IL] Israel .......................................... 69748

[51] Int. Cl.[4] ........................ B60R 25/06; E05B 65/12
[52] U.S. Cl. ........................................ 70/247; 70/202; 70/203
[58] Field of Search ................... 70/247, 248, 202, 203

[56] References Cited

U.S. PATENT DOCUMENTS

| 1,124,882 | 1/1915 | Flickinger | 70/203 |
| 1,165,352 | 12/1915 | Whiteside | 70/202 |
| 1,170,310 | 2/1916 | Miles | 70/203 |
| 1,258,630 | 3/1918 | Cornall | 70/202 |
| 1,338,131 | 4/1920 | Hendricks | 70/202 |
| 1,338,945 | 5/1920 | Manley | 70/203 |
| 1,423,955 | 7/1922 | Miller | 70/203 |
| 2,293,197 | 8/1942 | Dorr | 70/203 |
| 4,030,323 | 6/1977 | Stanislawczyk | 70/202 |
| 4,077,276 | 3/1978 | Knox, Jr. | 70/203 |

FOREIGN PATENT DOCUMENTS

| 151373 | 8/1952 | Australia | 70/203 |
| 1388314 | 12/1964 | France | 70/247 |
| 628058 | 8/1949 | United Kingdom | 70/203 |
| 2152454 | 8/1985 | United Kingdom | 70/247 |
| 2159783 | 12/1985 | United Kingdom | 70/247 |
| 2161771 | 1/1986 | United Kingdom | 70/248 |

Primary Examiner—William F. Pate, III
Assistant Examiner—Michael Safavi
Attorney, Agent, or Firm—McAulay, Fields, Fisher, Goldstein & Nissen

[57] ABSTRACT

A locking arrangement for preventing motorcar theft by locking the gearshift stick to a fixed portion of the motorcar including a rigid bar rigidly secured to a body portion of the motorcar in th vicinity of, parallel to and of a length shorter than the gearshift stick, a padlock body fixedly mounted onto the bar, and a separable padlock shackle adapted to be locked to the padlock body, with the stick enclosed by the shackle.

6 Claims, 8 Drawing Figures

LOCKING ARRANGEMENT FOR THE GEARSHIFT STICK OF VEHICLES

RELATED APPLICATIONS

This application is a continuation-in-part of my co-pending U.S. patent application Ser. No. 650,310, filed 9/12/84 now abandoned.

FIELD OF THE INVENTION

The present invention relates to antitheft devices for motorcars, and, more particularly, to an arrangement for preventing the theft of motorcars by locking the gearshift stick or lever to a fixed portion of the motocar.

BACKGROUND OF THE INVENTION

There are known in the art a large variety of devices which were designed to sole the problem of motorcar theft by immobilizing the gearshift stick by locking it, for example, to the steering wheel or to a pedal of the vehicle. These locking devices generally comprise a rod or chain provided with suitable locking means.

Some of these devices relate back to the beginning of the century. Apparently, not even one of the suggested arrangements succeeded in deterring or preventing car theft, and their use was abandoned. Among the most old-fashioned devices, which might seem particularly relevant in the context of the present invention, were those disclosed in the following publications: U.S. Pat. Nos. 1,048,783 filed July 27, 1911; 1,338,131 (May 22, 1919) and 1,423,955 (May 28, 1921). Other devices disclosed in the patent literature include U.K. Pat. Nos. 997,868 (July 18, 1963) and 1,014,940 (Sept. 2, 1963), and German Pat. No. 27 36 552 (Aug. 13, 1977). These devices generally provide for the locking of the gearshift lever against a fixed, stationary component or portion of the car body.

U.S. Pat. No. 1,048,783, for example, discloses means for immobilizing the gear shift lever but was not at all originally concerned with car theft. In those early days of automotive vehicles, a problem of accidents existed, where open-cabin automobiles used to be left on the street with the engine running (as the "starter" had not yet been invented), and children or other unauthorized persons were tempted to just step in and drive away. This device includes an arm riveted to the frame of the car and a hinged, U-shaped hasp pivotably mounted on the arm. The hasp is adapted to fold back to clear the way for the normal manipulation of the gear lever. After the hasp is folded about the gear shift lever, an additional safety lock is required to secure the hasp in the closed orientation. This construction is bulky and cumbersome.

There is shown in U.S. Pat. No. 1,423,955 a locking device for the emergency brake or gear shift lever of an automobile including a plate affixed to the front portion of the driver's seat, to which is hingedly affixed a cylindrical body. Affixed to the cylindrical body is a shank to which, in turn, a padlock is affixed. Mounted about the hinge is a heavy spring which serves to urge the padlock to rest perpendicular to and adjacent the driver's seat when not in use.

U.S. Pat. No. 1,338,131 discloses a similar hinged locking device affixed to the driver's seat or on the dashboard and hinged thereto for folding during driving. The device includes a plate affixed to the car body and a hasp pivotably attached thereto. The hasp includes two protruding pins at its outer end for insertion into and through a lock body.

U.K. Pat. No. 1,014,940 also discloses a hinged antitheft device including an arm pivotably mounted to the floor of the vehicle, the other end of the arm being provided with means for engaging the gearshift lever, preferably the shackle of a padlock. The bracket is pivotably mounted or articulated in order to permit disengagement of the arm from the lever. This is necessary because the shackle is affixed to the body of the vehicle (via the arm), the lock body being attached thereto during locking. Due to this construction, the only place this locking arrangement can be mounted is towards the rear of the vehicle, between the seats. This is so because if the pivotable bracket were mounted at the side of the gear-change lever, the lever would be movable together with the arm, permitting shifting of the gears even in the locked orientation.

These devices also suffer from the disadvantage that they require use of both hands of the user to engage and disengage the locking mechanism, as opposed to the neat and convenient way of manipulating the device of the present invention by one hand only.

Other locking mechanisms, less relevant than the above, are shown in U.S. Pat. Nos. 4,426,861, 1,408,806, 1,309,925, Australian Pat. No. 151,373 and U.K. patent application No. 2,023,076A.

Since none of these devices or arrangements became popular or were used even on a limited scale, it can be safely stated that the technological progress in this particular art rejected the idea of having, within the confined space of the driver cabin, an additional, relatively large-sized, member that might impair routine driving; and in fact, most of the later applied inventive skill was dedicated to ways and means of concealing or removing the disturbing object in the form of a projecting locking bar, which would be in addition to, and in clear functional conflict with, the gearshift lever itself. The trend was in the direction of means other than purely mechanical, i.e., mostly electronic (computerized) systems. Most of those mechanical devices which were developed were not permanently affixed to the car body, but rather were removable during use of the car.

There exists, therefore, an element of mental daring and surprise in proposing—against the general trend—to return to a construction that was generally accepted as totally obsolete, rather than another sophisticated system of the type that has recently become so popular.

SUMMARY OF THE INVENTION

Against this background, it is an object of the present invention to provide a locking mechanism which is extremely simple in construction and convenient in use.

There is thus provided in accordance with the present invention a locking arrangement for preventing motorcar theft by locking the gearshift stick to a fixed portion of the motorcar including a rigid bar rigidly secured to a body portion of the motorcar in the vicinity of, parallel to and of a length shorter than the gearshift stick, a padlock body fixedly mounted onto the bar, and a separable padlock shackle adapted to be locked to the padlock body, with the stock enclosed by the shackle.

The padlock body and its support bar are preferably installed alongside the gearshift lever on the opposite side of the car from the driver (i.e., the right-hand side in a car having its steering wheel on the left-hand side), so that it is hardly noticed and could not interfere in any way with driving and gear changing, particularly in cars with automatic transmission. The locking and unlocking require minimum time and can be performed by one hand only.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
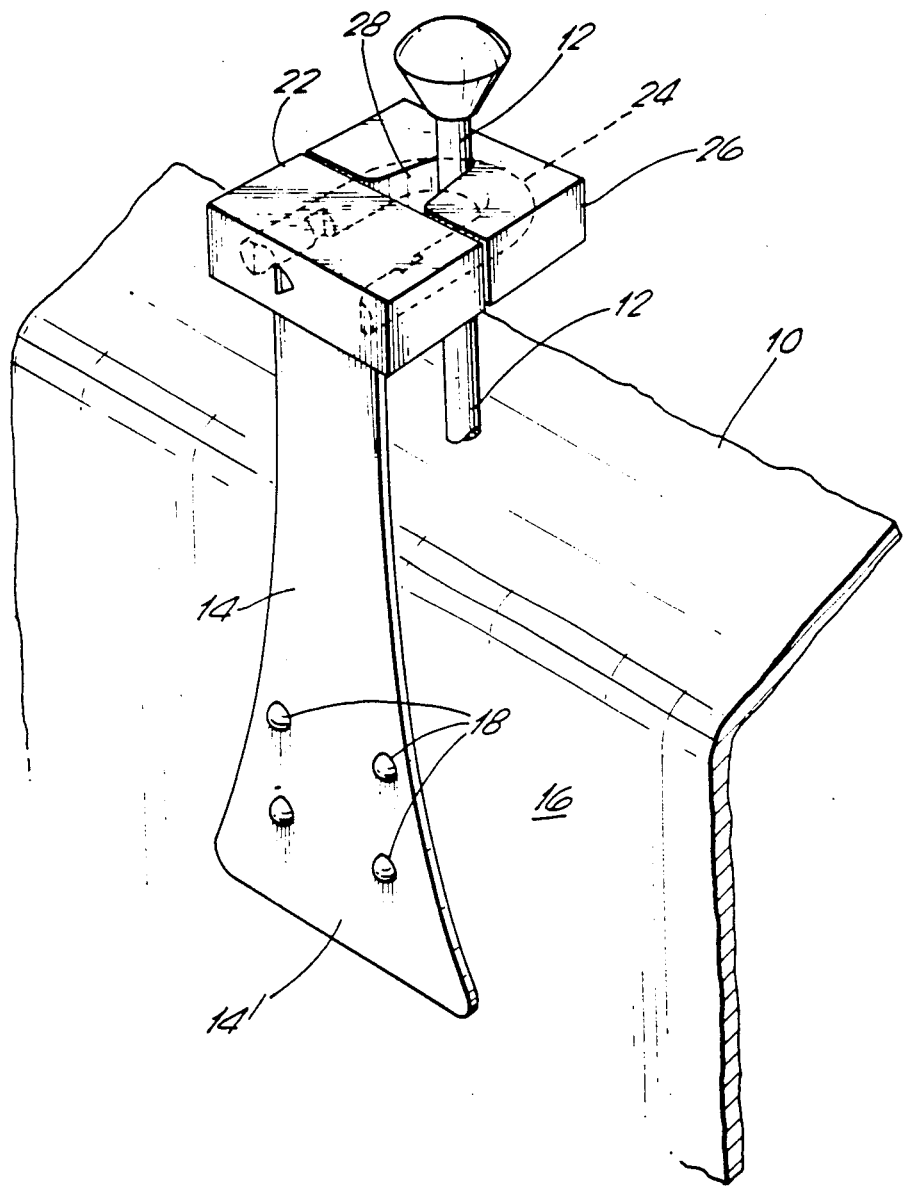
FIG. 1 is a schematic three-dimensional view of a locking arrangement constructed and operative in accordance with the present invention.
Figures 2, 3:
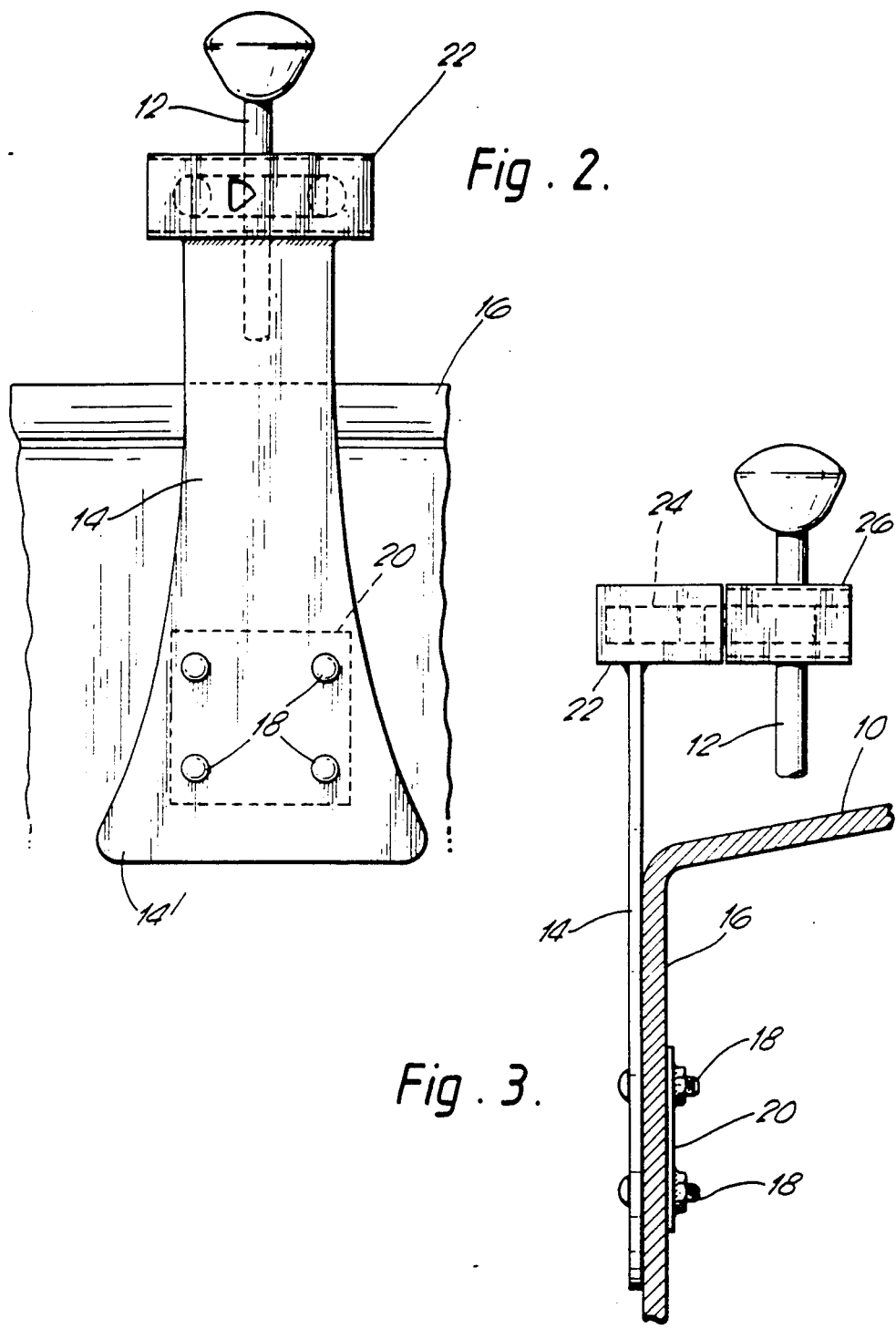
FIG. 2 is a side view of the arrangement shown in FIG. 1.
FIG. 3 is a front view of the arrangement of FIG. 2.

In FIGS. 1 and 2, a portion 10 of the vehicle is shown which accommodates the mounting of the gearshift stick 12 (normally the floor portion at the front right-hand side of the driver). A bar member 14 extends vertically in parallel with the gearshift stick 12 and is rigidly affixed to a stationary portion of the car body. The bar 12 is shorter than the stick 12; i.e., it reaches to below the top thereof. The bar 14 is made of hardened steel, and preferably comprises a lower enlarged section 14' with any kind of suitable arrangement by which it can be secured firmly to a body or chassis portion of the vehicle.

In the examplified embodiment, the bar is attached to a profiled floor portion 16 of the vehicle (see FIG. 3) by four bolts 18 tightened against and welded to a backing safety plate 20. Obviously, any other mounting and securing means could be used, considering, among other things, the shape and form of the motorcar floor portion 10 which changes from one model to another.

It is a particular feature of the present invention that the locking device can be mounted at any side of the gearshift lever and is arranged to lock the lever at any one of its outer or peripheral gear positions. When locked, neither the lever nor the bar can be moved. Furthermore, mere removal of the shackle upon unlocking frees from gearshift lever for use, without requiring any manipulation of the bar or locking arrangement. According to a preferred embodiment, it is located on the far side of the gearshift lever from the driver.

Figure 4:
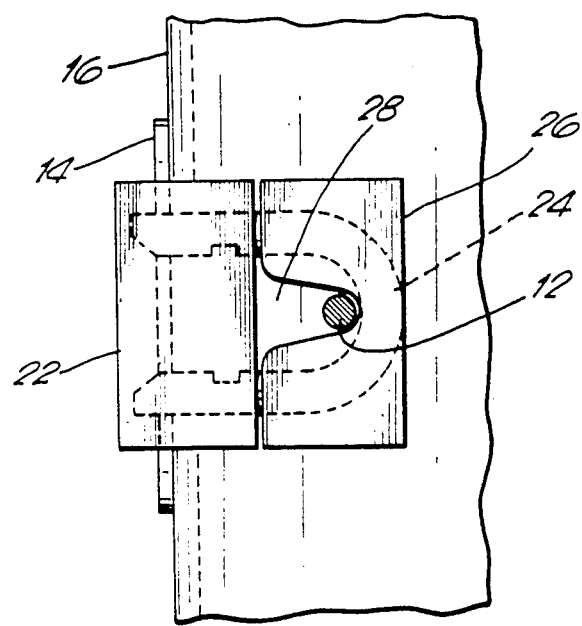
FIG. 4 is a top view of the arrangement shown in FIGS. 2 and 3.
Figure 5:
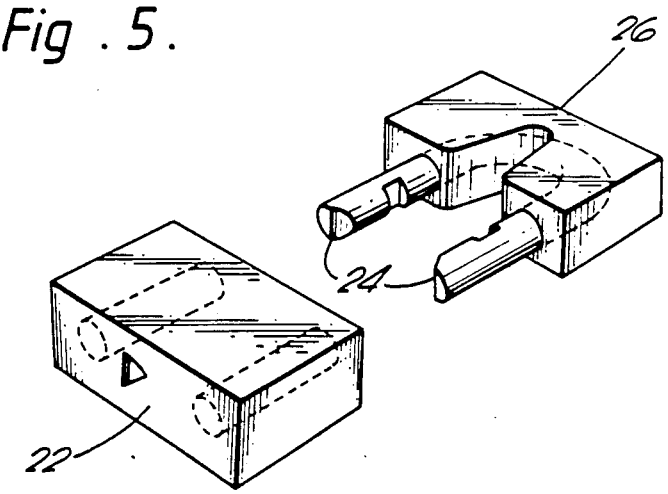
FIG. 5 shows the padlock body and padlock shackle in their separated or detached positions.

Mounted at the free end of the bar 14 is the housing or body of a padlock 22. The padlock body 22 is shown to be welded to the bar 14, but any other securing means may be used. The counterpart of the padlock housing 22 is shackle 24, which is separable from the body 22 as clearly seen in FIG. 5. As further shown, the curved portion of the shackle 24 is embedded in a metal enclosure 26, illustrated as being block-like in shape, which defines a recess 28 for receiving therein the gearshift stick 12 when in the locked orientation of the arrangement, as best seen in FIG. 4. Thus, the padlock becomes, in its locked orientation, a practically unified body preventing access by saw or other cutting device to the legs of the shackle 24.

Figure 6:
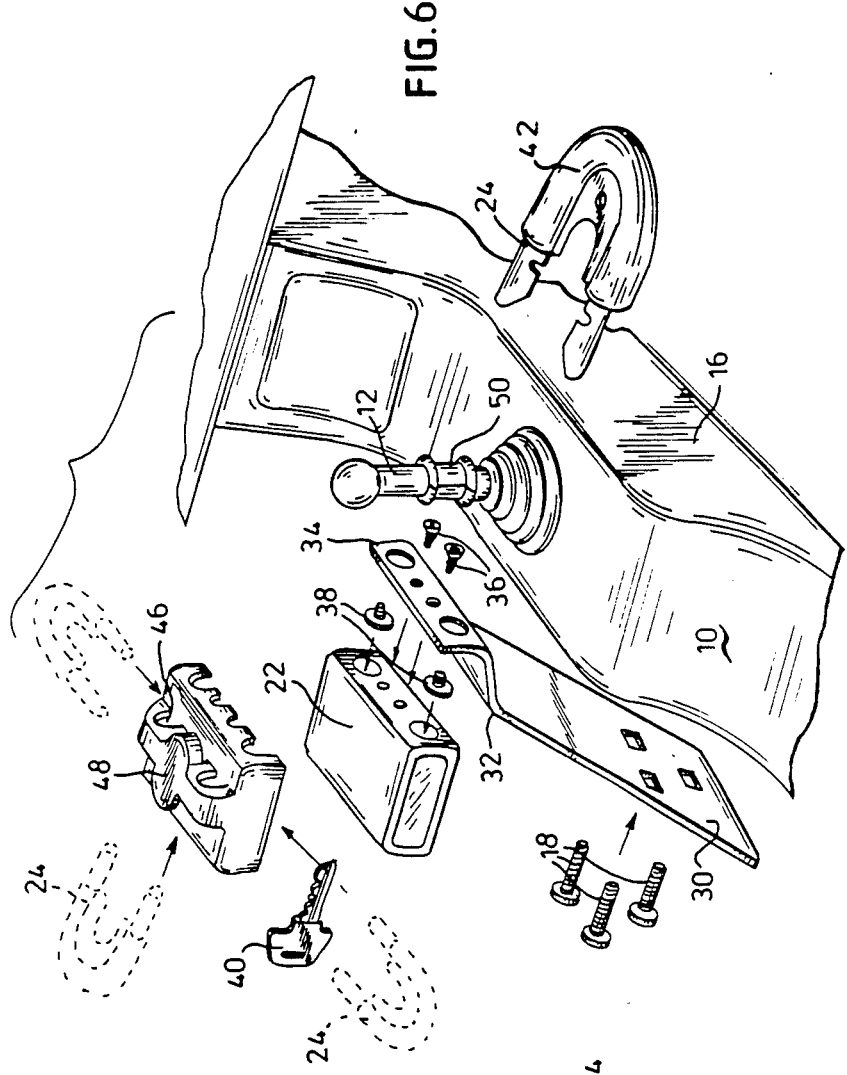
FIG. 6 is an exploded view of a locking arrangement constructed and operative in accordance with an alternate embodiment of the invention.

Referring now to FIG. 6 there is shown a locking arrangement according to an alternate embodiment of the present invention. Like elements in FIGS. 1 and 6 have like reference numerals. The locking arrangement comprises a rigid bar 30 rigidly affixed adjacent the gearshift lever 12. Bar 30 is bent to define an upper seating portion 32 and upward flange 34 against which the lock body 22 seats. Lock body 22 is affixed to bar 30 as by bolts 36.

At least one, and preferably a pair of spring elements 38 are mounted within lock body 22 and arranged to be engaged and tensioned by the legs of shackle 24 when in the locked orientation. As mentioned above, it is a particular feature of the present invention that the arrangement can be locked and unlocked using only one hand. This characteristic is provided by spring elements 38 which serve to eject, at least partially, the shackle from the lock body when a key 40 unlocks the padlock.

Shackle 24 is enclosed within and protected by a metal enclosure 24 which, in this embodiment, is rounded following the contours of the shackle. A decorative cover 44 may be provided on the lock body 22. Cover 44 preferably defines a plurality of apertures 46 and/or protrusions 48 which accomodate the shackle when in the unlocked and separated orientation. This provides a convenient location for storing the lock shackle during driving and prevents loss thereof.

Another problem arising with conventional locking arrangements is that by removal of the upper knob or handle of the gearshift lever, as by sawing, a thief can forcibly lift and remove the locking arrangement from the lever. In order to prevent such an occurence, the locking arrangement, according to a preferred embodiment illustrated in FIGS. 7a and 7b, also includes a collar element 50 mounted about the gearshift lever 12. Collar element 50 comprises two half shells 52 arranged for slideable inter-engagement with one another about the lever. They may be mounted on the lever 12 in a locked orientation upon removal of the upper knob or handle of the lever, which is then replaced.

Figure 7A:
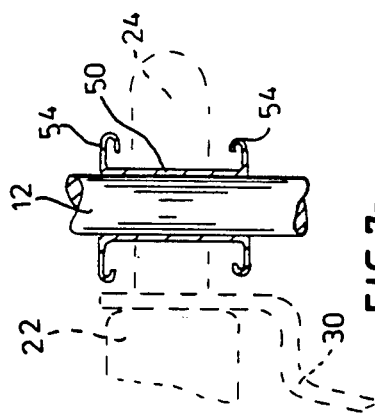
FIGS. 7a and 7b are detail views of a portion of the locking arrangement of FIG. 6.
Figure 7B:
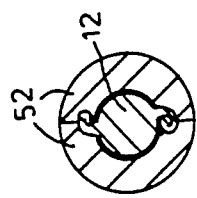

Half shells 52 define protruding flanges or lips 54 at both ends thereof so as to define a central recess arranged to receive shackle 24. Preferably shells 52 comprise hardened steel so as to prevent tampering with the shackle or sliding of the shackle off the end of the lever. FIG. 7a is a side view of a collar element 50 according to one embodiment of the present invention and FIG. 7b is a sectional view thereof.

It will be now readily comprehended that the arrangement according to the present invention constitutes a simple, yet extremely effective means against car theft, which is so common these days. It will also be appreciated that many modifications and variations of the invention may be applied without departing from the scope thereof, as defined in and by the appended claims.

I claim:

1. An arrangement for preventing motor car theft by locking the gearshift stick to a fixed portion of the motor car comprising a rigid bar rigidly secured to a body portion of the motor car in the vicinity of, parallel to and a length shorter than that of the gearshift stick, a padlock body fixedly mounted onto the bar, and a separable padlock shackle adapted to be locked to the padlock body with the stick enclosed by the shackle, said rigid bar defining a flanged seating portion to which said lock body is affixed and through which the legs of said shackle are inserted in the locked orientation.

2. The arrangement as claimed in claim 1, wherein the shackle is enclosed with a protective enclosure, the protective enclosure defining a recess for receiving the stick in its locked orientation.

3. The arrangement as claimed in claim 1, wherein the bar, the padlock, and shackle are made of hardened steel.

4. The arrangement as claimed in claim 1, and further comprising at least one spring element mounted in said lock body and arranged to be engaged and tensioned by the legs of said shackle in the locked orientation and arranged to at least partially eject said shackle from said lock body in the unlocked orientation.

5. The arrangement as claimed in claim 1 and further comprising means coupled to said lock body for accomodating said shackle in the separated, unlocked orientation.

6. The arrangement as claimed in claim 1 and further comprising collar means mounted about the gearshift stick and defining a recess therein for accomodating said shackle.

* * * * *